United States Patent
Sathe et al.

(10) Patent No.: US 7,490,022 B2
(45) Date of Patent: Feb. 10, 2009

(54) SYSTEM AND METHOD FOR RAPID TESTING OF INTERMITTENTLY OPERATED DEVICES

(75) Inventors: Abhay Sathe, Fort Collins, CO (US); Stephen D. Janes, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 499 days.

(21) Appl. No.: 11/093,443

(22) Filed: Mar. 30, 2005

(65) Prior Publication Data

US 2006/0241884 A1 Oct. 26, 2006

(51) Int. Cl.
*G06F 15/00* (2006.01)

(52) U.S. Cl. .................. 702/182; 702/181; 702/108; 455/423; 370/252

(58) Field of Classification Search .................. 702/182, 702/79, 67.14, 181, 108; 714/31, 36, E11.179, 714/E11.149; 455/423, 454, 456.3, 67.14; 709/219, 223; 707/E17.12, E17.121; 715/700; 719/329; 370/329, 401, 392, 252, 338

See application file for complete search history.

(56) References Cited

U.S. PATENT DOCUMENTS

| | | | |
|---|---|---|---|
| 4,392,208 A | 7/1983 | Burrows et al. | |
| 6,326,986 B1 | 12/2001 | Alexander | |
| 6,701,342 B1 | 3/2004 | Bartz et al. | |
| 6,782,421 B1 | 8/2004 | Soles et al. | |
| 7,190,978 B2* | 3/2007 | Saikyo et al. | 455/566 |
| 7,215,951 B2* | 5/2007 | Tanaka et al. | 455/423 |
| 2003/0078050 A1* | 4/2003 | Carlborg et al. | 455/452 |
| 2003/0154428 A1 | 8/2003 | Pelner | |
| 2006/0183477 A1* | 8/2006 | Bocking et al. | 455/435.2 |

FOREIGN PATENT DOCUMENTS

GB 2 059 122 A 9/1980
WO WO 2004/049746 6/2004

OTHER PUBLICATIONS

Agilent Technologies Publication #5989-0143EN, "Agilent OSS Wireless Service Manager."
Agilent Technologies Publication #5989-0748EN, "Agilent OSS Wireless QoS Manager."

* cited by examiner

*Primary Examiner*—Carol S Tsai

(57) ABSTRACT

A system for rapid testing of devices includes a test performance component capable of testing an intermittently operated device, an interface component capable of providing a release interval value and a measurement interval value, and a test control component capable of receiving the release interval value and the measurement interval value from the interface component and of providing the release interval value and the test interval value to the test performance component, and the test performance component being capable of initiating interaction between the intermittently operated device and the test performance component, of performing a plurality of tests, each test from the plurality of tests occurring over one test interval value, and of terminating the plurality of tests after a predetermined condition is satisfied.

20 Claims, 7 Drawing Sheets

SYSTEM AND METHOD FOR RAPID TESTING OF INTERMITTENTLY OPERATED DEVICES

BACKGROUND OF THE INVENTION

The number and type of network services used has increased over the years. Network service providers have to streamline network management and processes, bring new services online quickly and deliver consistently high quality of service in order to reduce operating costs and attract and retain customers. Support systems (test systems) can help achieve these objectives.

A number of the presently used networks, such as but not limited to, mobile (cell phone) networks, dial-up services for home Internet access, include devices that are not continuously in operation (hereinafter called intermittently operated devices). Before intermittently operated devices, such as, but not limited to, cell phones or modems, can be tested they have to be powered up, initialized in the correct state, and registered with the target system (for example, a wireless network) being tested for the test to perform as expected. A similar process has to be followed when the test of the intermittently operated device is completed. The intermittently operated device used to be released (for example disconnected, then registered and powered off) in a systematic way. The setup and release processes have to be repeated for every device under test.

The setup and release processes for an intermittently operated device consume a significant amount of time compared to the test time. Repeating the setup and release process adds a very significant amount of overhead to the test. Since system resources, such as hardware devices and wireless connections, are typically in scarce supply, such an overhead represents a significant waste of available resources.

A variety of test software/hardware products can be used to test wireless or wired line networks including intermittently operated devices. The available test software/hardware products address the testing overhead problem in several different approaches.

Some available test products perform the setup process on the device the first time any test requires it and then retain a device in the state obtained through the setup process. This approach requires that the device manager component of the test product continuously monitor the device performance between tests and perform periodic maintenance on the device to keep the device stable. This approach also requires each test system implementation to be tailored to the type of network being tested and does not allow each test to be individually configured. Since the stability of devices varies significantly for different technologies and for the type of test being performed, this approach requires more software tasks or tailoring of software.

Other available test products include the setup and release process in every test is performed. This approach results in significant overhead.

There is therefore a need to provide the capability to perform tests on intermittently operated devices in a more efficient manner.

BRIEF SUMMARY OF THE INVENTION

An embodiment of the system for efficient testing of intermittently operated devices of this invention includes a test performance component capable of testing an intermittently operated device, an interface component capable of providing a release interval value and a measurement interval value, and a test control component capable of receiving the release interval value and the measurement interval value from the interface component and of providing the release interval value and the test interval value to said test performance component. The test performance component is capable of initiating interaction between the intermittently operated device and the test performance component, of performing a number of tests, each test occurring over one test interval value, and of terminating the tests after a predetermined condition is satisfied.

Methods and computer program products for rapid testing of intermittently operated devices are also disclosed.

For a better understanding of the present invention, together with other and further needs thereof, reference is made to the accompanying drawings and detailed description and its scope will be pointed out in the appended claims.

DETAILED DESCRIPTION OF THE INVENTION

Methods and systems for efficient testing of intermittently operated devices in networks are disclosed below.

"Intermittently operated devices" as used herein refers to devices, such as, but not limited to, mobile (cell phone) networks, dial-up services for home Internet access, that are not continuously in operation.

Figure 1:
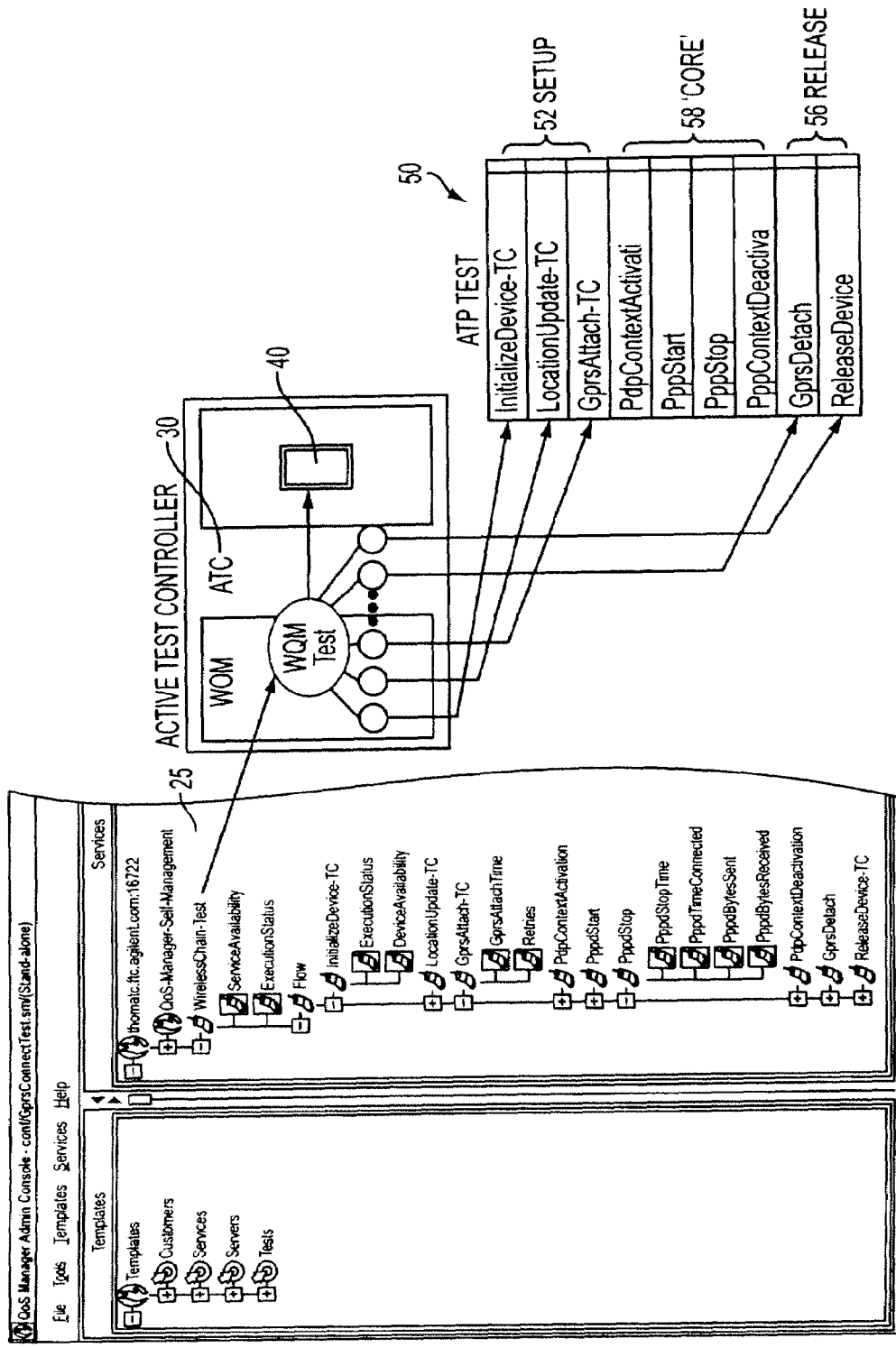
FIG. 1 is a graphical schematic representation of test execution in a conventional test system.

In order to facilitate the understanding of the methods and systems of this invention, a brief discussion of a prior art system is presented below. A graphical schematic representation of the execution of a test of an intermittently operated device where the test is being performed utilizing a conventional test system is shown in FIG. 1. Referring to FIG. 1, a typical test of an intermittently operated device, such as a wireless device, is outlined in an interface component 20, a graphical user interface in the embodiment shown. The graphical user interface 20 depicts a number of steps (also referred to as test elements). Shown in the interface component 20 is a sequence of test elements 25 which translates into a test and deployed by a test control component 30. The test control component 30 initiates the tests that are performed by a test performance component 40 and collects test data (also referred to as measurements). The test data is analyzed by the test control component 30. (Typical of the systems shown in FIG. 1 are user interface in the Agilent Technologies OSS Wireless QoS Manager for the test interface component and the Active Test Controller in the Agilent Technologies Wireless QoS Manager for the test control component.)

FIG. 1 shows the test sequence and the test elements 50 displayed as rectangular boxes in a sequential fashion in the graphical user interface 20. This sequence 50 is also referred to as a "flow." The test control component 30 structures the flows for the test and provides that information to the test performance component. Shown in the test flow 50 are the setup 52 and release instructions 56 as well as a "core" test instructions 58. In the test execution shown in FIG. 1, the setup and release instructions are performed in every test performed.

Figure 2:
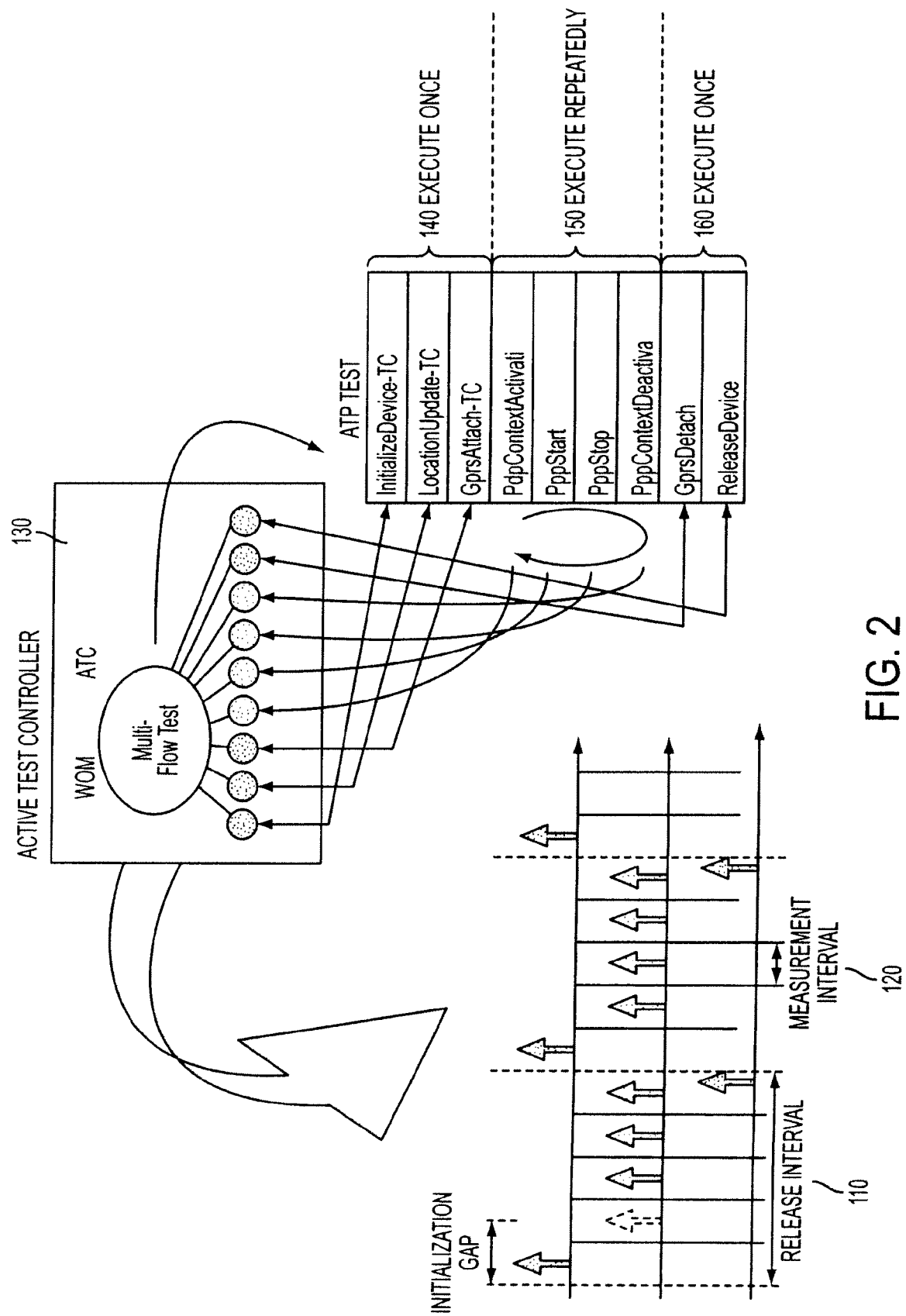
FIG. 2 is a graphical schematic representation of test execution in an embodiment of the test system of this invention.

A graphical schematic representation of the execution of a test of an intermittently operated device where the test is being performed utilizing an embodiment of a test system of this invention is shown in FIG. 2. Referring to FIG. 2, a release interval value 110 and a measurement interval value 120 are provided to the test control component 130. The test control component 130 determines the number of measurement intervals in one release interval 120 (equivalently, determines the number of test to be performed in one release interval). The release interval value 120 is chosen, in one embodiment, but not limited only to that embodiment, so that the intermittently operated device to be tested is reasonably stable in the network under consideration. For example, in one embodiment, the release interval could be set to 5, 15, 30, or 60 minutes.

At the start of the release interval, the test elements 140 that initialize the intermittently operated device for testing are executed (in the embodiment shown, the device is initialized, the device location is updated, and the device makes a network connection, attaching to a General Packet Radio Service (GPRS) network). After initializing, the "core" test elements 150 are performed to execute one test of the intermittently operated device. The core test elements 150 are executed repeatedly in order to repeat the testing of the intermittently operated device. In the last measurement interval, before the end of the release interval 120, the release test elements 160 are performed (the device is disconnected from the GPRS network, and the device is released).

Figure 3A:
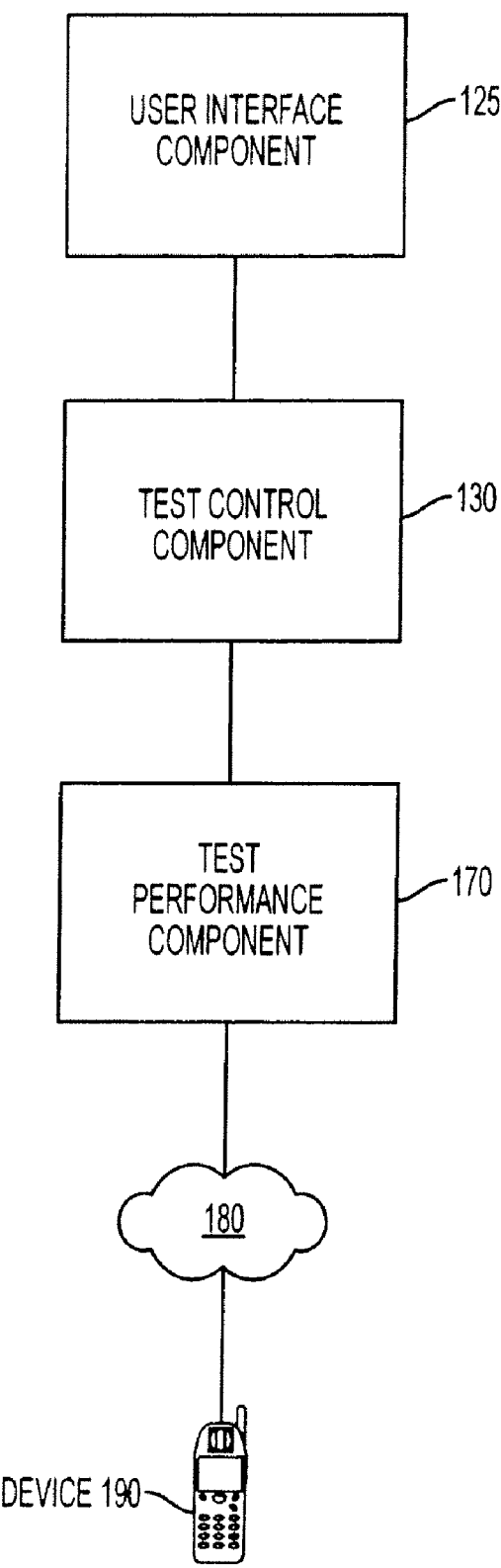
FIG. 3a is a block diagram schematic representation of an embodiment of the test system of this invention.

Another view of an embodiment of the system of this invention is shown in FIG. 3a. Referring to FIG. 3a, the embodiment 200 of the system of this invention includes an interface component 125, a graphical user interface (GUI) in one embodiment, a test control component 130, and a test performance component 170. The test performance component 170 connects through a network 180 to at least one intermittently operated device 190. The interface component 125 provides the release interval value and the measurement interval value to the test control component 130. The release interval value and the measurement interval value can be obtained, in one embodiment, through user input via a graphical user interface or, in another embodiment, could be obtained from a user selected release interval value and identification of the device to be tested. A variety of other embodiments of procedures for obtaining the release interval value and the measurement interval value are possible, ranging from being obtained from knowledge of the device to be tested and the measurements to being obtained by complete user input as described above.

The test control component 130 receives the release interval value and the measurement interval value and provides them to the test performance component 170. The format in which the release interval value and the measurement interval value are provided to the test performance component 170 is determined by the implementation used. In one embodiment the test flow structure such as that shown in FIG. 2 can be used to provide some of the information to the test performance component 170. In another embodiment, the test control component 130 provides a number of parameters to the test performance component 170. In that embodiment, the parameters can include the maximum test duration, which would be a release interval value, a test frequency which would be a test interval value and other parameters. The other parameters can include a maximum number for an identifier, where the test performance component 170 or, in another embodiment, the control component 130 provides at least one identifier for each test being performed. Another parameter that may be provided in some embodiments is a test timeout value.

Figure 3B:
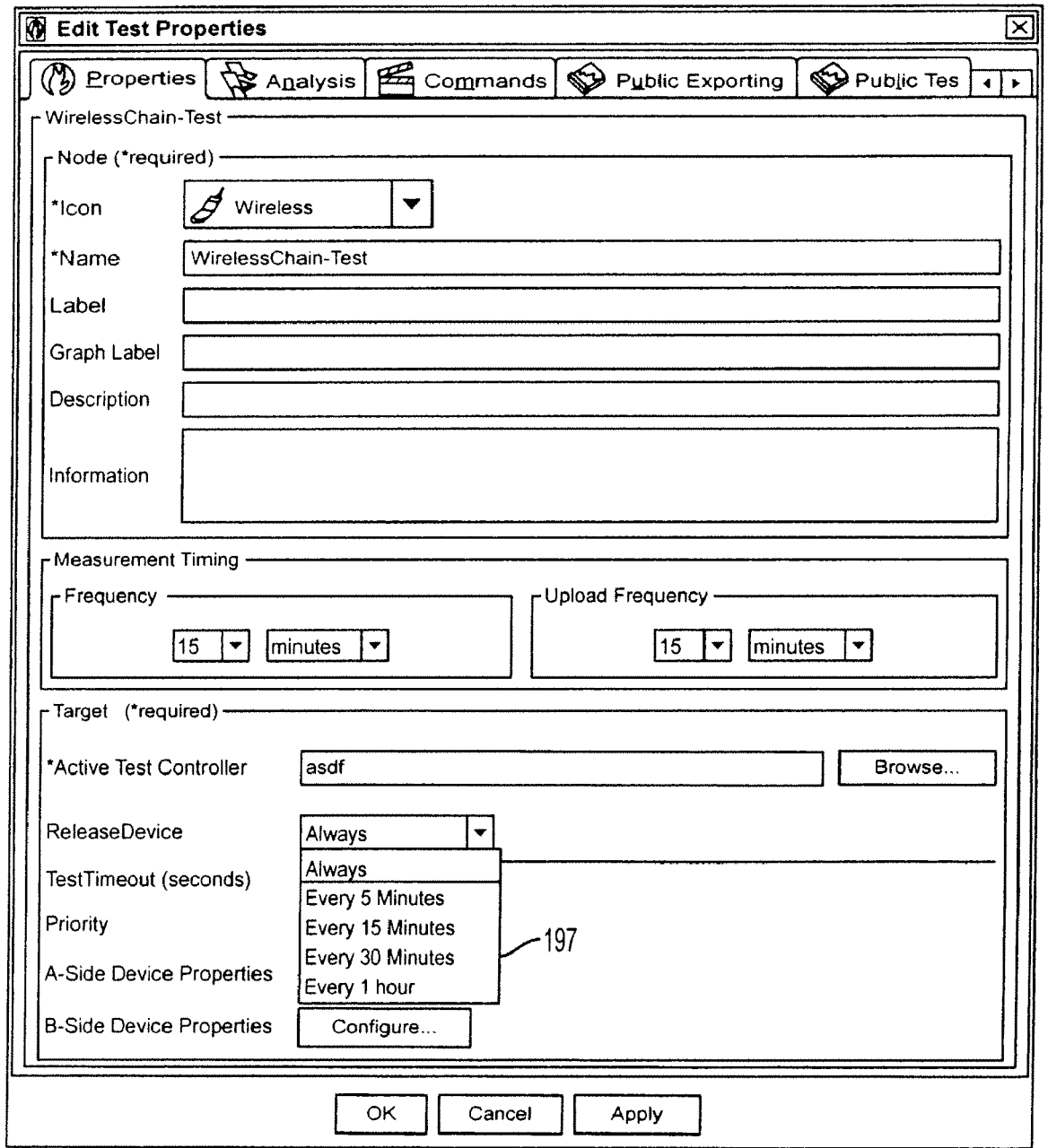
FIG. 3b is a graphical schematic representation of an embodiment of an interface component of the test system of this invention.

One embodiment of the interface component 125 of this invention is shown in FIG. 3b. Referring to FIG. 3b, the user interface 195 provides for the user's selection of a Release Device parameter 197 corresponding to the release interval value. As shown in FIG. 3b, the release device parameter 197 is said to "always," which corresponds to system operation equivalent to the conventional system of FIG. 1.

The test performance component 170 can, in one embodiment, comprise service test agents that connect, either directly or through a network, to test performing components. The test performance component 170, or in one embodiment the service test agents, provide the information to initiate the interaction between the intermittently operated component of 190 and the test performance component 170, to perform the desired tests, and to terminate the tests when a predetermined conditioned is met. (In one embodiment, the test control component 130 provides test parameters and information and receives test results from the service test agents.) The predetermined condition can be, but is not limited to be, determined by the release interval, determined by the release interval value and the measurement interval value, or a value provided by the user. The test performance component 170 provides the test results to the test control component 130.

There are various possible embodiments for the format in which results and measurements from the tests are communicated from the test performance component 170 with the test control components 130. In the embodiment shown in FIG. 2, the test flow includes concatenation of all the tests and, similarly, the test results for all the tests in the test flow are communicated in a concatenated fashion. There are several possible embodiments to implement the reporting of test results in one concatenated flow in a manner that the test results can be separated when received by the test control component. In one embodiment, implemented in software, one or more identifiers are provided for each individual test in the test flow. More than one test identifier may be necessary for each individual test. For example, if the test results from each individual test are stored in a format that allows only a given number (for example, but not limited to, 6) of results to stored in one row, and the results from one test exceed that given number, then the results from that one test have to be stored in several rows. Each row in the format requires one identifier. Thus, the results from one test will correspond to a group of identifiers. In that embodiment, the test control component 130 provides a parameter to the test performance component 170 that conveys the number of identifiers utilized in one test.

Figure 4:
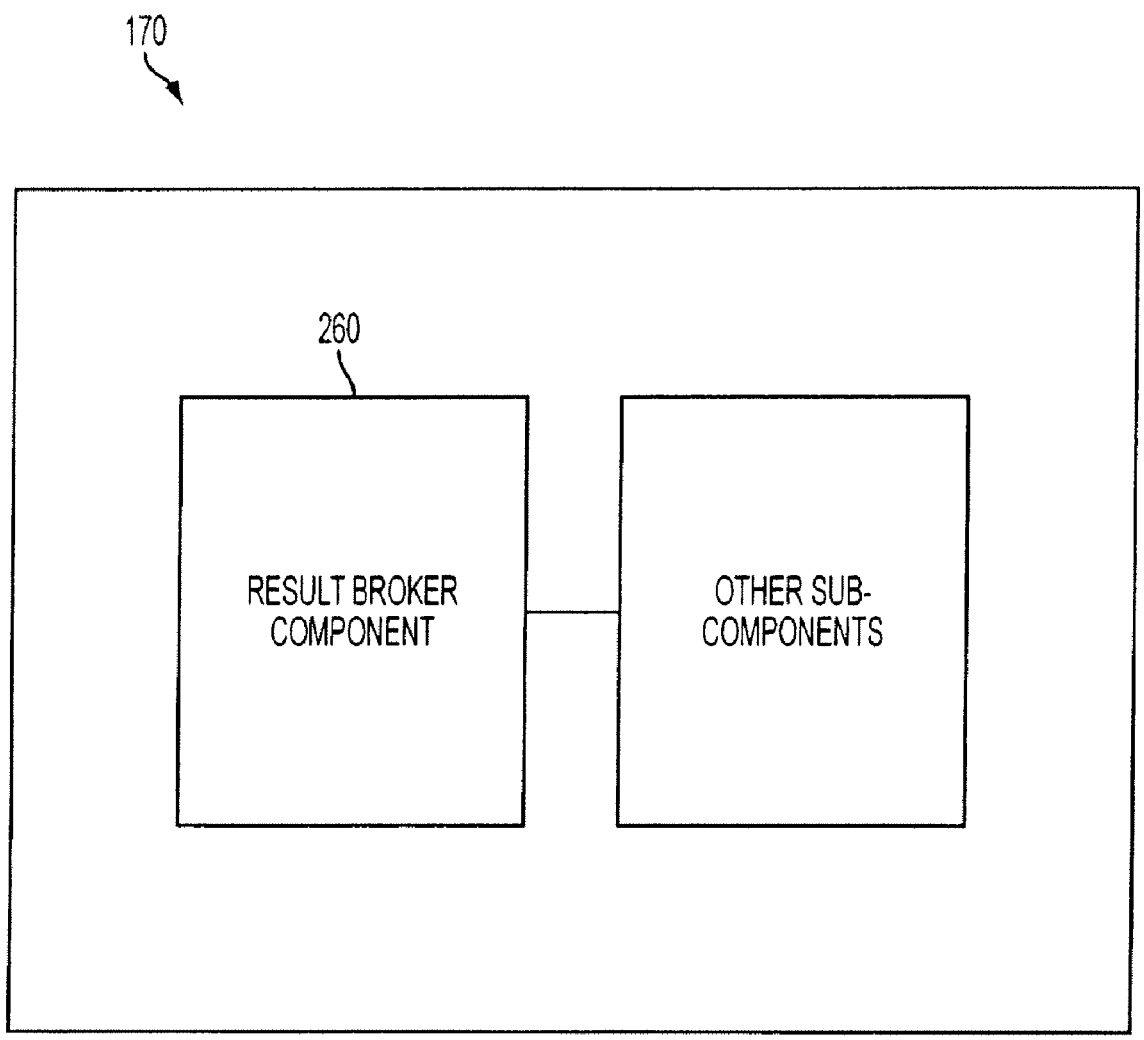
FIG. 4 is block diagram schematic representation of an embodiment of one component of the test system of this invention.

In another embodiment, the test control component 130 requests and receives the test results for each test separately. In that embodiment, the test results corresponding to the test flow of FIG. 2 would have to be received by the test control component 130 as a number of separate test results, each one of the separate test result occurring over one measurement interval. In this embodiment, shown in FIG. 4, the test performance component 170 includes a result broker component 260. The result broker component 260 receives the request to perform each separate test from the test control component 130 and assembles into a number of tests. (In one embodiment, the result broker component 260 collects the requests into request blocks. For each request block, the result broker component initiates one instance of the number of tests.) A tight protocol is established between the result broker component 260 and the other sub components in the test performance component 170 so that when one test from the number of tests is completed, the measurement data is received by the result broker component 260. The result broker component 260 provides the received measurement data for the one test to the test control component 130.

Figure 5:
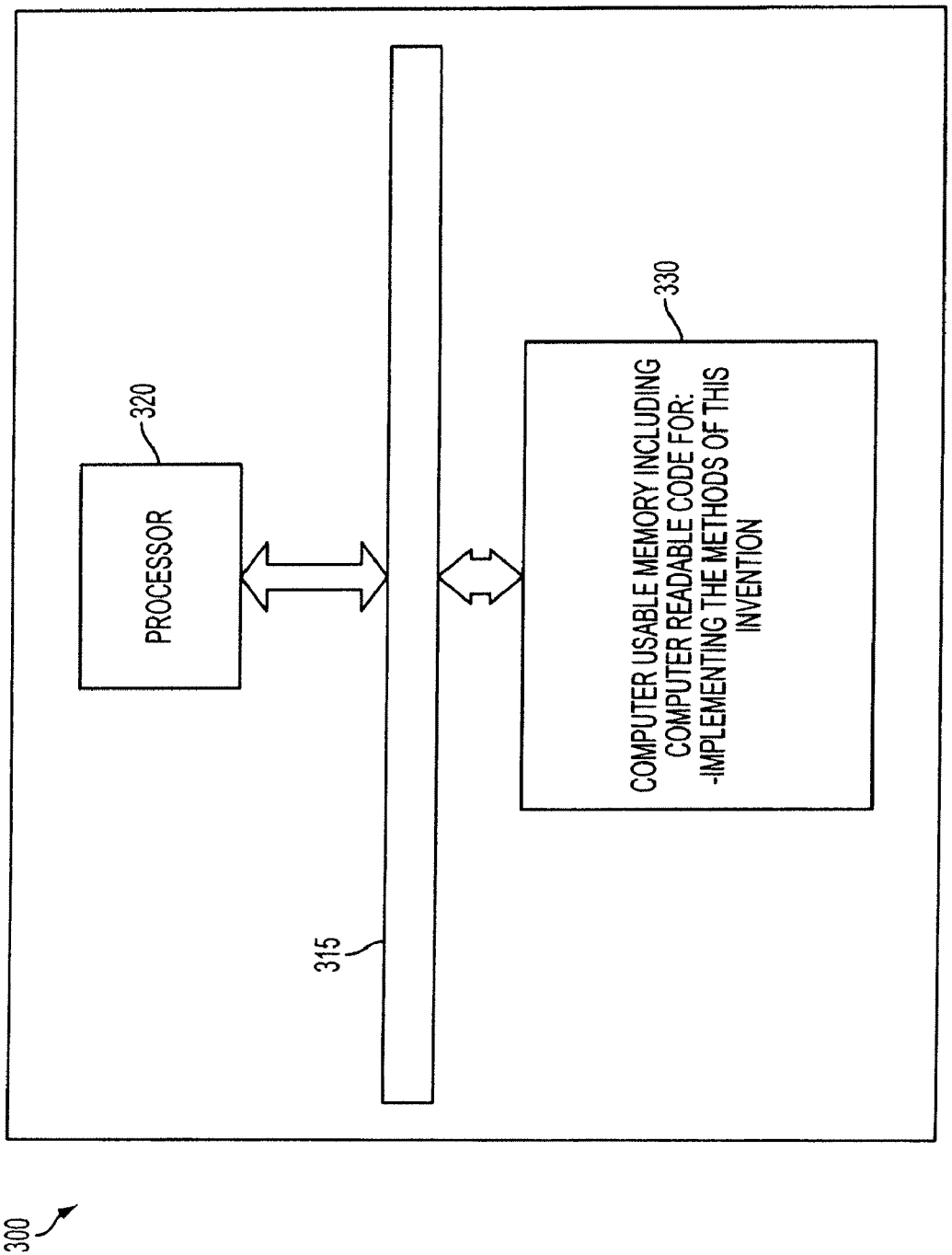
FIG. 5 is block diagram schematic representation of an embodiment of one or more components of the test system of this invention.

Shown in FIG. 5 is a block diagram schematic representation of an embodiment of one or more components of the test system of this invention. Referring to FIG. 5, one or more processors 320 are operatively connected by means of a connection component 315 (the connection component may be a computer bus, a carrier connection whether wired or wireless or a combination thereof) to a computer usable (readable) medium 330 having computer usable code (also referred to as instructions or programs) embodied therein, where the computer usable code is capable of causing the one or more processors 320 to execute the methods of this invention. The computer readable code is capable of causing the one or more processors 320 to obtain a release interval value and a measurement interval value, to determine the number of test to be performed, using in the determination the release interval value and the measurement interval value, to provide/obtain one or more parameters for the communication of test results from the test performance component 170 to the test control component 130, and to utilize a status indicator obtained from the test results of each one test in order to indicate test completion. The computer readable code can also cause they one or more processors 320 to provide/obtain one or more identifiers for each test to be performed, to communicate the test results from the test performance component 170 to the test control component 130.

In an exemplary embodiment, other embodiments also being within the scope of this invention, the test control component 130 provides to the test performance component 170 the following parameters in addition to the conventional parameters:

```
MaxTcDuration <release interval value>
TestTimeout <Test Timeout in Admin Console>
Frequency <measurement interval value>
StartTime <that which is initialized by the base test>
MaxCallID
```

The Frequency and StartTime parameters are used by the test performance component 170 to perform interval alignment of the results.

In this embodiment, the MaxCallID parameter is used in formatting the result communicated from the test performance component 170 to the test control component 130. Each test performed produces a given number of results, which for definiteness in this embodiment is referred to as N. The test results are stored utilizing a format that only allows a finite number, which for definiteness in this embodiment is referred to as R, of results to be stored in a row. If R is less than N, more than one row will be necessary in order to store the results. Each row has a given identifier, CallID. In order to facilitate the communication between the test control component 130 and the test performance component 170, the parameter MaxCallID provides the maximum number of rows needed to store the results of one test.

In one embodiment, another method is used to facilitate fast data delivery between the test performance component 170 and the test control component 130. In this embodiment, the test performance component 170 provides a status indicator to indicate test completion for each test. Such status indicators include "Pass", "Fail", "Inconclusive", "Aborted". The detection of the status indicator by the test control component 130 would indicate to the test control component 130 that the test has been completed.

Figure 6:
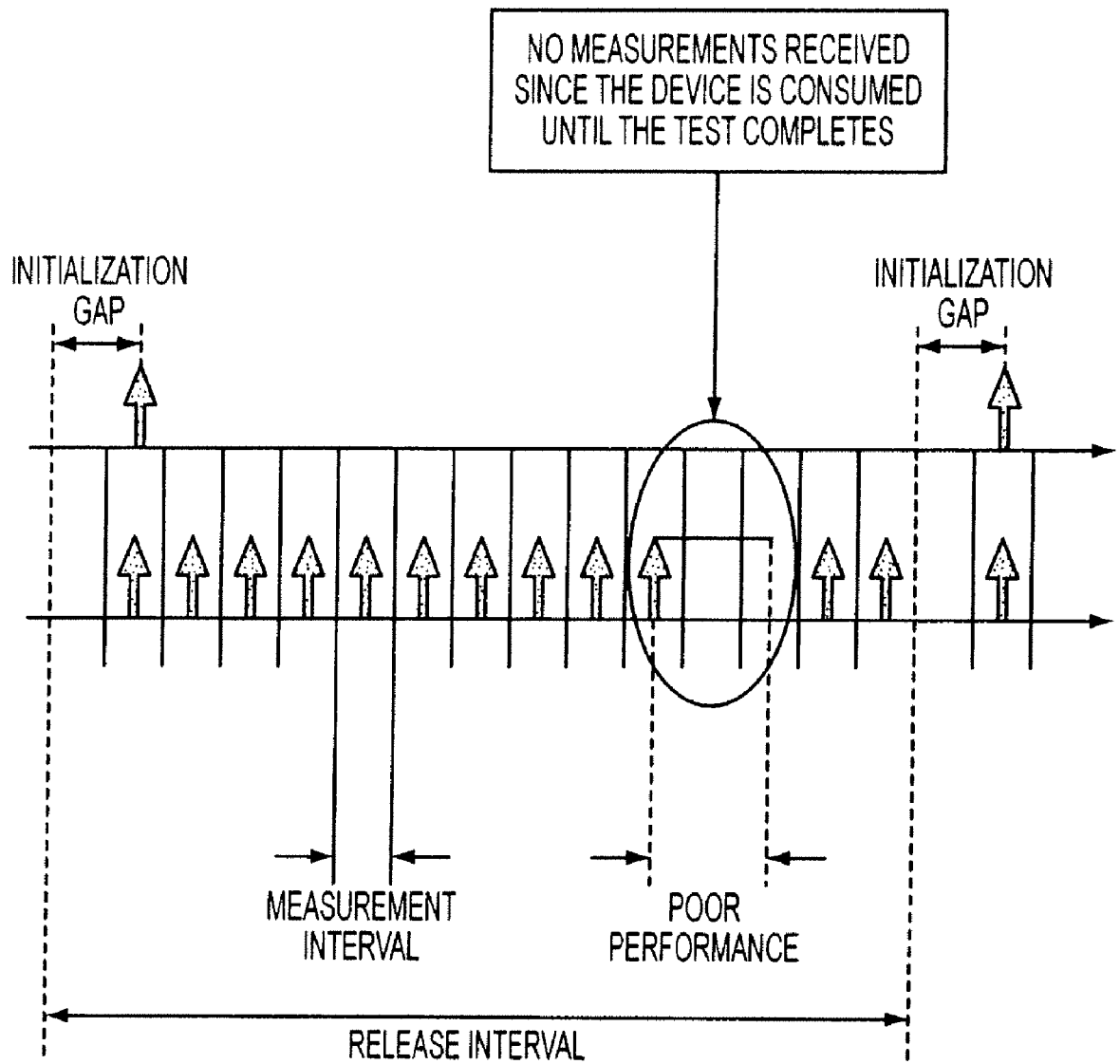
FIG. 6 represents a graphical schematic representation of test execution in another embodiment of the test system of this invention.

When one of the tests to be performed (also referred to as one of the "core" tests) either takes longer than the measurement interval or shorter than the measurement interval, adjustments to the result collection process have to be made. In those conditions, if one of the core tests is completed before the measurement interval, a start of the next test until the expected start time of the next test is delayed. If one of the core tests requires a longer interval than the measurement interval, at least one of the succeeding tests to be performed is skipped and a test at the next scheduled time (approximately an integer number of measurement intervals) is performed. This last condition is shown in FIG. 6.

Referring again to FIG. 5, if one of the core tests is completed before the measurement interval, the computer readable code is capable of causing the one or more processors 320 to delay a start of the next test until the expected start time of the next test. If one of the core tests requires a longer interval than the measurement interval, the computer readable code is capable of causing the one of more processors 320 to skip at least one of the succeeding tests to be performed and perform a test at the next scheduled time (approximately an integer number of measurement intervals).

In order to further illustrate the methods of this invention, an exemplary embodiment is presented herein below. Shown in Table 1 below is an example of a test flow, Flow A, such as the test flow shown in FIG. 2. In Flow A, a GPRS connection is made to an intermittently operated device (such as, but not limited to, a cell phone) and a web test is performed. Flow B receives and analyzes a message received as a result of the Web test execution from Flow A period.

TABLE 1

| FlowA | | FlowB | |
|---|---|---|---|
| Initialize Device | 0 | Initialize Device | 0 |
| Location Update | 1 | Location Updtate | 1 |
| Gprs Attach | 2 | — | |
| Gprs Pdp context Activate | 3 | — | |
| Gprs Ppp Start | 4 | — | |
| Sync Await | 5 | Sync Send | 2 |
| Message Send | 6 | Message Receive | 3 |
| Dcs Export (Message Info) | 7 | Message Receive | 4 |
| Ppp Stop | 8 | Message Analyze | 5 |
| Gprs Pdp context Deactivate | 9 | — | |
| Gprs Detach | 10 | — | |
| Release Device | 11 | Release Device | 6 |

For Flow A, Test elements 2-10 are the "core" test elements (the results for these test elements are needed for every test interval), and for Flow B, Components 3-5 are the "core" test elements. For both Flows, Test elements 0 and 1 are the device initialization elements (the measurements form these test components are needed in the measurements form these test components are needed in the first test interval only). For Flow A, element 11 and for flow B, element 6 are the device release elements (the measurements are needed only in the last test interval before releasing the device).

Before starting the processing of the flows, identifiers (call IDs) required by all the individual tests (each one repeating the "core" elements) are generated. Then, the number of tests to be performed has to be determined. In one embodiment, the number of tests to be performed is determined by the release interval and the measurement interval. The tests are then performed.

In one embodiment, the test performance component 170 reports the test results as described below. Each individual test has a corresponding number of Call ID's. The collection (Chain) of measurements for each test element references the call ID number used for the first individual test.

For each subsequent individual test, the call ID for each measurement is derived from the following formula Call ID=Call ID supplied for the measurement+(Number of Call ID's needed per individual test (the MaxCallId parameter)*current individual test count).

Table 2, shown herein below, illustrates how Call ID's are assigned for each individual test.

TABLE 2

| Call ID | a_string + b_String + c_string | a_value to f_value |
|---|---|---|
| 1 | Chain Result for test 1 | Measurements for individual test 1 |
| 2 | | Measurements for individual test 1 |
| 3 | | Measurements for individual test 1 |
| 4 | Chain Result for individual test n | Measurements for individual test n |
| 5 | | Measurements for individual test n |
| 6 | | Measurements for individual test n |

The communication between the test control component 130 and the test performance component 170 may be, in one embodiment but not limited to that embodiment, by means of a markup language (such as, for example, XML).

An exemplary embodiment, utilizing XML, of the communication between the test control component 130 and the test performance component 170 is provided herein below in order to further illustrate the present invention, although the present invention is not limited to only this embodiment. In this exemplary embodiment, the start of the results from one of the tests from the number of tests (the nth test) is clearly designated by the following tag (Note that the XML tag might have additional attribute) provided by itself on one line:

<FlowA loop=n> and the end of the results is indicated by the following tag:

</FlowA>

The results for one tests are presented in a tagged string (in one embodiment, but not limited only to this embodiment, containing a maximum of 300 characters). The format of the string is as presented herein below:

The results are delimited between the tokens <e> and </e>

<o> </o> Delimits Outcome. Outcome can be pass, fail, inconclusive. If outcome is pass, then the remaining tags below are not present/ignored/empty <f> </f> Delimits the flow name where the error occured.

<tc> </tc> delimits the Service Model name of the testcomponent that reported the error <te> </te> delimits the brief error description <ed> </ed> delimits the error detail. The error detail may be truncated to ensure that the total length of the result, including the tags, does not exceed 300.

An example (although the present invention is not limited to this example) of the use of each of the above presented delimiters is shown below:

```
<e>
  <o>pass</o>
  <f>FlowA</f>
  <tc>Sendrs_Pdp_context_Activation</tc>
  <te>Error in Pdp Context Activation</te>
  <ed>Das APN http://foo.com lehnte acces ab. Überprüfen
    Sie bitte, ob
das SIM Konto auf der Fördermaschine 'My-Mobile DE' ermöglicht
wird;</ed>
</e>
```

It should be noted that other embodiments are of the representation of the results are also within the scope of this invention.

It should be noted that, although FIG. 3 shows an embodiment with three separate components, the three separate components can be physically one device, or two devices or more, and that such embodiments are within the scope of this invention. The components can be combined in physical embodiments utilizing a number of physical devices but achieving the same result.

It should be noted that each of the separate components shown in FIG. 3 (or each device in the embodiment where the three components comprise physically less than three devices) can each include a processor 320 as in FIG. 5 or a single processor 320 can be located in one of the devices or components. It should also be noted that each one of the devices or components may include a computer readable medium 330 as in FIG. 5.

It should be noted that although FIG. 5 shows one computer readable medium (memory), more than one memory could be utilized and that the more than one memory could be distributed among the three components of FIG. 3. The system could be a distributed system and any technology used to implement distributed systems, such as, but not limited to, CORBA, DCOM, RMI, servlets, Java Beans, could be used. Similarly, more than one processor could be utilized and that the more than one processor could be distributed among the three components of FIG. 3.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), and, in some embodiments, also including at least one input device, and/or at least one output device. Program code may be applied to data entered using the input device (or user interface) to perform the functions described and to generate output information. The output information may be applied to one or more output devices.

Elements and components described herein may be further divided into additional components or joined together to form fewer components for performing the same functions.

Each computer program may be implemented in any programming language, such as assembly language, machine language, a metalanguage (such as XML), a markup language, a high-level procedural programming language, an object-oriented programming language, or a combination thereof. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, such as electromagnetic radiation or electrical signals, or any other medium from which a computer can read.

Although the invention has been described with respect to various embodiments, it should be realized this invention is also capable of a wide variety of further and other embodiments within the spirit and scope of the appended claims.

What is claimed is:

1. A system for rapid testing of devices, the system comprising:
    a test performance component configured for testing an intermittently operated device;
    an interface component configured for providing a release interval value and a measurement interval value; and
    a test control component configured for receiving the release interval value and the measurement interval value from the interface component and of providing the release interval value and the measurement interval value to said test performance component; and
    said test performance component being configured for initiating interaction between said intermittently operated device and said test performance component, of performing a plurality of tests, each test from said plurality of tests occurring over one measurement interval value, and of terminating said plurality of tests after a predetermined condition is satisfied, all within an interval specified by the release interval value.

2. The system of claim 1 wherein said test performance component comprises:
    a result broker component configured for receiving test results for said each test after completion of said each test and of providing said test results for said each test to said test control component.

3. The system of claim 1 wherein said test component is configured for receiving results from said plurality of tests from said test performance component.

4. The system of claim 1 wherein said predetermined condition is determined utilizing said release interval value and said measurement interval value.

5. The system of claim 1 wherein said interface component comprises a graphical user interface.

6. The system of claim 1 wherein said test control component comprises:
    at least one processor;
    at least one computer readable medium having computer readable code embodied therein, said computer readable code being configured for causing at least one processor to:
        obtain a release interval value and a measurement interval value from said interface component,
        determine a number of tests to be performed, utilizing said release interval value and said measurement interval value in the determination,
        obtain at least one parameter for communication of test results from the tests, and
        receive test results from the tests.

7. The system of claim 6 wherein said computer readable code is also configured for causing said at least one processor to:
    utilize a status indicator to indicate test completion, said status indicator being obtained from test results for one test.

8. The system of claim 6 wherein said computer readable code is also configured for causing said at least one processor to:
    delay a start of a next test until an expected start time, if a preceding test was completed before a time determined as a function of said measurement interval value.

9. The system of claim 6 wherein said computer readable code is also configured for causing said at least one processor to:
    skip at least one test to be performed, if a preceding test required a test completion interval longer then said measurement interval value, and
    perform a test corresponding to a next expected start time.

10. A method for rapid testing of devices, the method comprising:
    providing a release interval value and a measurement interval value for test control;
    determining a number of tests to be performed on an intermittently operated device utilizing said release interval value and said measurement interval value; and
    performing the following within an interval specified by the release interval value:
        initializing the intermittently operated device for testing;
        testing the intermittently operated device; and
        repeating the testing of the intermittently operated device until a predetermined condition occurs.

11. The method of claim 10 wherein repeating the testing of the intermittently operated device comprises:
    determining the predetermined condition utilizing the release interval value and the measurement interval value.

12. The method of claim 10 further comprising:
    providing at least one identifier for each test performed.

13. The method of claim 10 further comprising:
    providing one or more status indicators obtained from performing one test.

14. The method of claim 10 further comprising:
    providing at least one parameter for test result communication.

15. A computer program product comprising:
    at least one computer readable medium having computer readable code embodied therein, said computer readable code being configured for causing at least one processor to:
    obtain a release interval value and a measurement interval value,
    determine a number of tests to be performed, utilizing said release interval value and said measurement interval value in the determination,
    initiate interaction between an intermittently operated device and a test performance component, perform a plurality of tests, each test from said plurality of tests occurring over one measurement interval value, and terminate said plurality of tests after a predetermined condition is satisfied, all within an interval specified by the release interval value; and obtain at least one parameter for communication of test results from the tests.

16. The computer program product of claim 15 wherein said computer readable code is also configured for causing said at least one processor to:

utilize a status indicator to indicate test completion, said status indicator being obtained from test results for one test.

17. The computer program product of claim 15 wherein said computer readable code is also configured for causing said at least one processor to:

provide at least one identifier for each of the tests.

18. The computer program product of claim 15 wherein said computer readable code is also configured for causing said at least one processor to:

communicate test results from a testing component to a control component.

19. The computer program product of claim 15 wherein said computer readable code is also configured for causing said at least one processor to:

delay a start of a next test until an expected start time, if a preceding test was completed before a time determined as a function of said measurement interval value.

20. The computer program product of claim 15 wherein said computer readable code is also configured for causing said at least one processor to:

skip at least one test to be performed, if a preceding test required a test completion interval longer then said measurement interval value, and perform a test corresponding to a next expected start time.

* * * * *

UNITED STATES PATENT AND TRADEMARK OFFICE
CERTIFICATE OF CORRECTION

PATENT NO. : 7,490,022 B2  Page 1 of 1
APPLICATION NO. : 11/093443
DATED : February 10, 2009
INVENTOR(S) : Sathe et al.

It is certified that error appears in the above-identified patent and that said Letters Patent is hereby corrected as shown below:

In column 9, line 51, in Claim 3, delete "test" and insert -- test control --, therefor.

Signed and Sealed this

Fourteenth Day of July, 2009

JOHN DOLL
*Acting Director of the United States Patent and Trademark Office*